United States Patent
Rhode et al.

(10) Patent No.: US 10,160,281 B2
(45) Date of Patent: Dec. 25, 2018

(54) ROAD ROUGHNESS PREVIEW WITH DRIVE HISTORY

(71) Applicant: Ford Global Technologies, LLC, Dearborn, MI (US)

(72) Inventors: Douglas Scott Rhode, Farmington Hills, MI (US); Shane Elwart, Ypsilanti, MI (US); Nanjun Liu, Urbana, IL (US); Thomas Edward Pilutti, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 406 days.

(21) Appl. No.: 14/268,401

(22) Filed: May 2, 2014

(65) Prior Publication Data

US 2015/0314663 A1 Nov. 5, 2015

(51) Int. Cl.
*B60G 17/0165* (2006.01)
*G01C 21/34* (2006.01)

(52) U.S. Cl.
CPC ..... *B60G 17/0165* (2013.01); *G01C 21/3484* (2013.01); *B60G 2400/10* (2013.01); *B60G 2400/208* (2013.01); *B60G 2400/25* (2013.01); *B60G 2401/16* (2013.01); *B60G 2600/04* (2013.01)

(58) Field of Classification Search
None
See application file for complete search history.

(56) References Cited

U.S. PATENT DOCUMENTS

| 5,432,700 A | 7/1995 | Hrovat et al. |
| 6,233,510 B1 | 5/2001 | Platner et al. |
| 6,466,864 B1 | 10/2002 | Stefan et al. |
| 8,332,134 B2 * | 12/2012 | Zhang ............. G06K 9/00805 340/435 |
| 8,451,140 B2 | 5/2013 | Piccinini et al. |
| 2004/0015279 A1 * | 1/2004 | Barron ............. B60G 17/015 701/37 |
| 2004/0094912 A1 | 5/2004 | Niwa et al. |

(Continued)

FOREIGN PATENT DOCUMENTS

| CN | 103600636 A | 2/2014 |
| EP | 2322903 | 5/2011 |

(Continued)

OTHER PUBLICATIONS

Storey, "Performance Measures and Control Laws for Active and Semi-Active Suspensions", The School of Aerospace, Mechanical & Manufacturing Engineering Thesis, 469 pages.

(Continued)

*Primary Examiner* — Navid Ziaeianmehdizadeh
(74) *Attorney, Agent, or Firm* — Frank A. MacKenzie; Bejin Bieneman PLC (57) ABSTRACT

A vehicle includes a sensor configured to detect a first road feature, an adjustable suspension system, and a processing device. The processing device is configured to determine, using a drive history map, a location of the vehicle based on the first road feature and apply a suspension profile to the suspension system. The suspension profile is associated with a second road feature identified by the drive history map, which is at a different location from the first road feature.

17 Claims, 4 Drawing Sheets

(56) References Cited

U.S. PATENT DOCUMENTS

| | | | |
|---|---|---|---|
| 2005/0090956 A1 | 4/2005 | Ogawa | |
| 2007/0021886 A1* | 1/2007 | Miyajima | B60G 17/019 701/37 |
| 2009/0097038 A1 | 4/2009 | Higgins-Luthman et al. | |
| 2009/0312889 A1* | 12/2009 | Krupadanam | B60W 20/102 701/1 |
| 2011/0035105 A1* | 2/2011 | Jolly | B60G 17/015 701/37 |
| 2013/0060423 A1* | 3/2013 | Jolly | B60G 17/0152 701/38 |
| 2014/0195112 A1* | 7/2014 | Lu | B60G 17/015 701/37 |
| 2014/0257629 A1* | 9/2014 | Singh | B60C 23/064 701/34.4 |
| 2014/0297119 A1* | 10/2014 | Giovanardi | F15B 13/0444 701/38 |
| 2015/0046032 A1* | 2/2015 | Clarke | B60G 17/0195 701/37 |

FOREIGN PATENT DOCUMENTS

| | | |
|---|---|---|
| GB | 2492896 A | 1/2013 |
| GB | 2494415 A | 3/2013 |

OTHER PUBLICATIONS

Yan et al., "Road Condition Predicting with Kalman Filter for Magneto-Rheological Damper in Suspension System", Blekine Institute of Technology, Jul. 2012, Thesis, 40 pages.

GB Search Report for Application No. GB1507500.5 dated Oct. 29, 2015 (1 page).

Notification of First Office Action re CN Appl. No. 201510221271.4 dated Jun. 27, 2018 (English version and Original version).

* cited by examiner

ROAD ROUGHNESS PREVIEW WITH DRIVE HISTORY

BACKGROUND

Drivers often travel the same or similar routes to frequent destinations. For example, drivers commonly take the same roads from their home to their place of employment, and over time, learn to anticipate certain issues. For instance, drivers learn where traffic is usually the highest, which lanes back up during high traffic times, where potholes are, where the speed limits change, where rain accumulates during storms, and the like. With this knowledge, drivers can adjust their driving habits to anticipate issues that may arise in more problematic areas.

DETAILED DESCRIPTION

An exemplary vehicle is configured to anticipate various road conditions utilizing a drive history map and improves ride quality by adjusting the operation of the vehicle's suspension system. The vehicle includes a sensor and a processing device. The sensor is configured to detect a road feature having a particularly high roughness characteristic. Examples of road features may include potholes, speed bumps, cracks in the driving surface, expansion joints, or the like. A first trip records the road features and generates a drive history map to be used for all subsequent trials. On the second or any subsequent trials, the processing device is configured to determine the location of the vehicle based on the road feature detected and apply a suspension profile to the suspension system. The suspension profile is associated with the detected road feature or at least one subsequent road feature. In other words, the suspension profile can be used to adjust the operation of the suspension system to account for the roughness at the location of the detected road feature, at least one subsequent road feature, or both.

The elements shown in the FIGS. may take many different forms and include multiple and/or alternate components and facilities. The exemplary components illustrated are not intended to be limiting. Indeed, additional or alternative components and/or implementations may be used.

Figure 1:
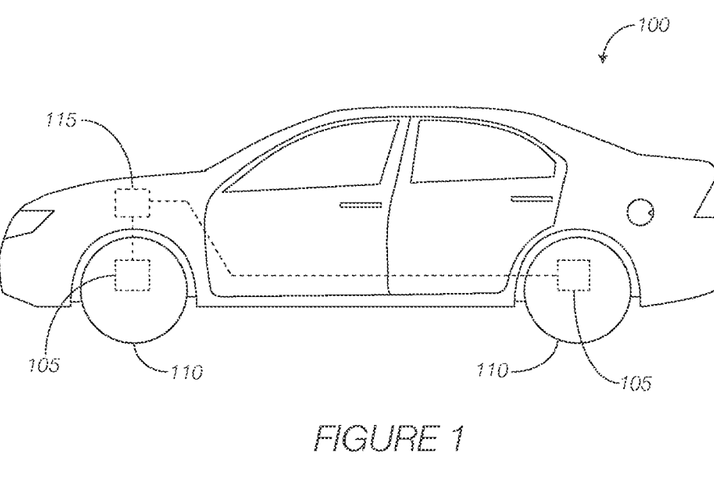
FIG. 1 illustrates an exemplary vehicle configured to anticipate various road conditions.

As illustrated in FIG. 1, the vehicle 100 includes a suspension system 105 operably attached to the wheels 110, and a suspension control system 115 that can be used to control the operation of the suspension system 105 in anticipation of various road features. Examples of road features may include potholes, speed bumps, cracks in the driving surface, expansion joints, or the like. As discussed in greater detail below, the suspension control system 115 may be configured to use one road feature to determine a location of the vehicle 100. After the road map is generated from the first trip, for any subsequent trips, once the location is determined, a suspension profile may be applied to subsequent road features. In some possible implementations, the suspension profile may be applied to the first road feature detected. Although illustrated as a sedan, the vehicle 100 may include any passenger or commercial vehicle such as a car, a truck, a sport utility vehicle, a taxi, a bus, etc. In some possible approaches, as discussed below, the vehicle 100 is an autonomous vehicle configured to operate in an autonomous (e.g., driverless) mode, a partially autonomous mode, and/or a non-autonomous mode.

Figure 2:
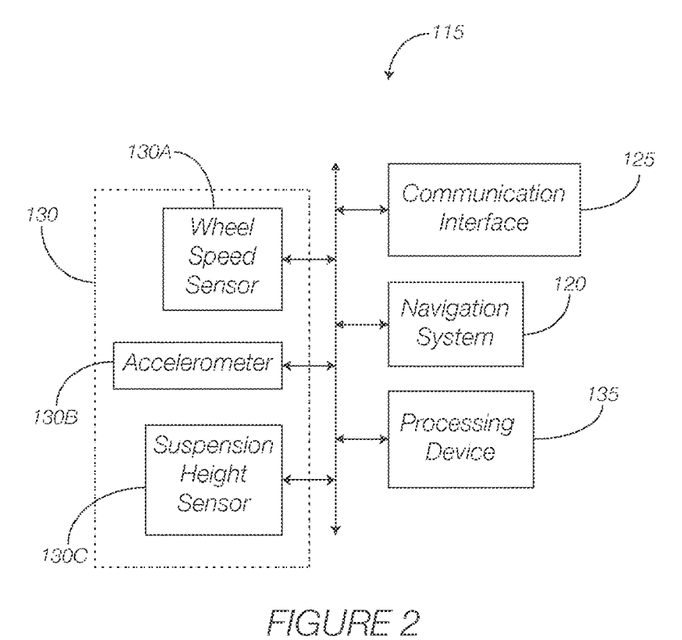
FIG. 2 is a block diagram of an exemplary vehicle system that may be used in the vehicle of FIG. 1.

Referring now to FIG. 2, the suspension control system 115 may include a navigation system 120, a communication interface 125, at least one sensor 130, and a processing device 135.

The navigation system 120 may be configured to determine a position of the vehicle 100, such as a current location of the vehicle 100. The navigation system 120 may include a Global Positioning System (GPS) receiver configured to triangulate the position of the vehicle 100 relative to satellites or terrestrial based transmitter towers. The navigation system 120, therefore, may be configured for wireless communication. The navigation system 120 may be further configured to develop routes from the current location to a selected destination, as well as display a map and present driving directions to the selected destination via, e.g., a user interface device. In some instances, the navigation system 120 may develop the route according to a user preference. Examples of user preferences may include maximizing fuel efficiency, reducing travel time, travelling the shortest distance, or the like.

The communication interface 125 may be configured to facilitate wired communication, wireless communication, or both, between the components of the vehicle 100 and other devices, such as a remote server or even another vehicle in accordance with a vehicle-to-vehicle communication protocol. An example of a vehicle-to-vehicle communication protocol may include, e.g., the dedicated short range communication (DSRC) protocol. Accordingly, the communication interface 125 may be configured to receive messages from and/or transmit messages to a remote server and/or other vehicle.

The sensor 130 may be configured to detect road features. As discussed above, examples of road features may include potholes, speed bumps, cracks in the driving surface, expansion joints, or any other feature that causes a vertical displacement of one or more of the wheels 110. In addition to measuring vertical displacement, the sensor 130 may be configured to measure the size of the road feature. Accordingly, the sensor 130 may include any one or more of a wheel speed sensor 130A, an accelerometer 130B, and a suspension height sensor 130C. The wheel speed sensor 130A may be configured to measure the wheel speed and output a signal representing the measured wheel speed. The distance the vehicle 100 has traveled can be calculated from the sensor 130 output by the wheel speed sensor 130A and the size of the wheel. Thus, the wheel speed sensor 130A can be used to measure the length of the road feature as well as the distance between road features. A wheel speed sensor 130A may be located on any number of wheels 110, including non-driven wheels (e.g., the rear wheels in a front wheel drive vehicle 100). The changes in measured wheel speed, and in particular the speed of the non-driven wheels, can be used to detect road roughness. The accelerometer 130B may be used to measure the vertical acceleration of the vehicle 100 caused by the road feature. For example, road roughness can be calculated from the power spectral density function of the road surface, and the accelerometer 130B may be configured to measure the power spectral density. Taking a Fourier transform of the readings by the accelerometer 130B over a window of time can yield a power spectral density curve, which is an indicator of road roughness. Moreover, the power spectral density may be normalized to a relative value instead of an absolute value when determining road roughness. The suspension height sensor 130C may be used to measure a vertical displacement of one or more wheels 110 caused by the road feature. Each sensor 130 may be configured to output signals representing their respective measurements, which may represent the detection of one or more road features.

The processing device 135 may be configured to determine a location of the vehicle 100 based on one or more detected road features. The processing device 135 may access a drive history map that identifies the locations of known road features and compare the characteristics of the road features associated with the signals received from one or more sensors 130 to the road features identified in the drive history map. The drive history map may be created during previous trips along the route. For instance, the processing device 135 may receive signals from one or more sensors 130 indicating a bump in the road. The bump may be registered as a road feature in the drive history map. The processing device 135 may use the location information output by the navigation system 120 to identify the location of the road feature. During subsequent trips along the same route, the processing device 135 may access the drive history map to determine the location of the road feature, and in some instances, use the location of the road feature to verify or confirm the location of the vehicle 100. That is, the processing device 135 may be configured to use the detected road feature as a more precise indication of the location of the vehicle 100. Once the road feature is detected, the processing device 135 may determine that the vehicle 100 is at the location associated with the road feature in the drive history map. The distances between road features registered in the drive history map can be calculated using the wheel speed sensor 130A to provide better accuracy compared with relying purely on the navigation system 120.

With the road feature and its location identified, the processing device 135 may apply a predetermined suspension profile to the suspension system 105. Each predetermined suspension profile may be associated with a particular road feature or type of road features. Operating the suspension system 105 in accordance with the predetermined suspension profile, therefore, may provide for a smoother driving experience for at least some known road features. For example, the processing device 135 may apply to the suspension system 105 a first damping coefficient at the location of a first road feature, a second damping coefficient at the location of a second road feature, a third damping coefficient at the location of a third road feature, and so on. Each damping coefficient may be based on a characteristic of the particular road feature to which it is applied. An example characteristic may include road roughness. Accordingly, the damping coefficient applied may be related to the road roughness.

The processing device 135 may determine the distance between two road features and apply the damping coefficients accordingly. The damping coefficient applied to the suspension system 105 may change prior to the vehicle 100 reaching the next road feature. The distance may be determined from the drive history map or calculated from one or more signals received from the sensors 130. For instance, the processing device 135 may determine that the vehicle 100 is about to reach a subsequent road feature based on the location data from the navigation system 120, the number of wheel rotations determined from one or more sensors 130, or any combination of these or other data points. In some possible approaches, the processing device 135 may determine the location of the vehicle 100 from the first road feature detected and apply the particular damping coefficients in the suspension profile to the subsequently encountered road features. In other implementations, however, the processing device 135 may attempt to apply a customized damping coefficient for each road feature encountered.

Instead of using raw data related to each road feature, or even the normalized power spectral density value, the processing device 135 may assign a classification to each road feature based on the measured roughness, and the applied damping coefficient may be associated with the classification. For instance, a smooth surface may be assigned a low roughness classification, an average pothole may be assigned a moderate roughness classification, and a deep pothole or speed bump may be assigned a high roughness classification. Therefore, the classification may be stored in the drive history map instead of or in addition to the raw sensor data concerning each road feature. As the vehicle 100 approaches an area with a particular roughness classification, the suspension system 105 may be operated according to that classification. That is, the processing device 135 may apply the appropriate suspension profile (e.g., damping coefficient) for that classification.

Figure 3:
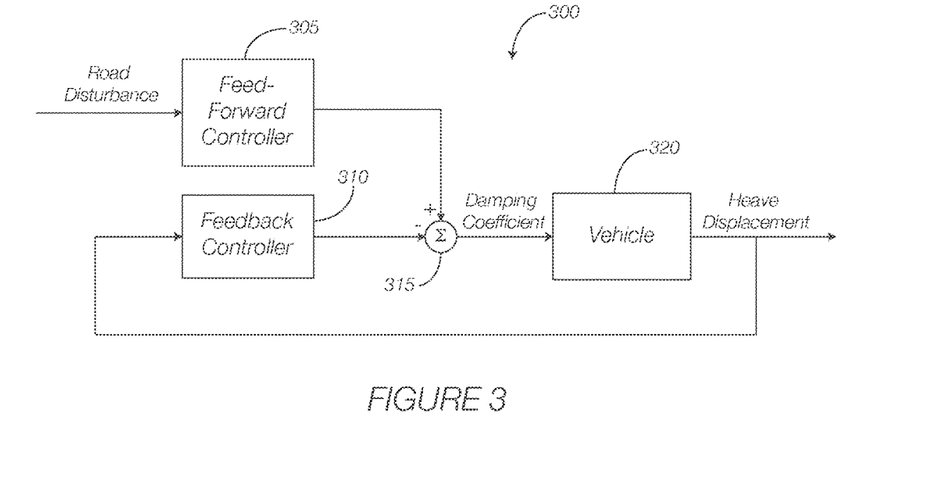
FIG. 3 is a control diagram illustrating how the vehicle may change a damping coefficient according to a detected road feature.

FIG. 3 is a control diagram 300 that may be used to adjust the damping coefficient given a particular road feature having a particular characteristic, as described above. The control diagram 300 includes a feedback controller 305, a feed-forward controller 310, and a summation block 315. The vehicle displacement is represented by the vehicle block 320. When the vehicle 100 approaches a particular road feature, the feed-forward controller 310 may output a particular value associated with the road feature. The value may be determined from the drive history map. The drive history map may associate the upcoming road feature with a particular classification such as a high roughness classification, a low roughness classification, or a moderate roughness classification. The output of the feed-forward controller 310 may be predetermined based on the data about the road feature stored in the drive history map. The amount of heave displacement experienced by the vehicle 100 may be output by the vehicle block 320. The heave displacement may be further fed into the feedback controller 305. The output of the feedback controller 305 may be subtracted from the output of the feed-forward controller 310 using the summation block 315. The output of the summation block 315, therefore, may represent the damping coefficient.

With the control diagram 300 of FIG. 3, the processing device 135 may attempt to minimize the heave displacement with the optimal damping coefficient. Equation 1 below defines a cost function, $$J = \sum_{i=1}^{N} z_s^2(i) \tag{1}$$

where $z_s$ is the heave displacement of the vehicle 100, i is the time index when the vehicle 100 is crossing a road feature, and N is the total number of measured time steps from when the vehicle 100 first encounters the road feature until the oscillations settle. The heave displacement $z_s$ is a function of the damping coefficient when the road disturbance is known.

Figure 4:
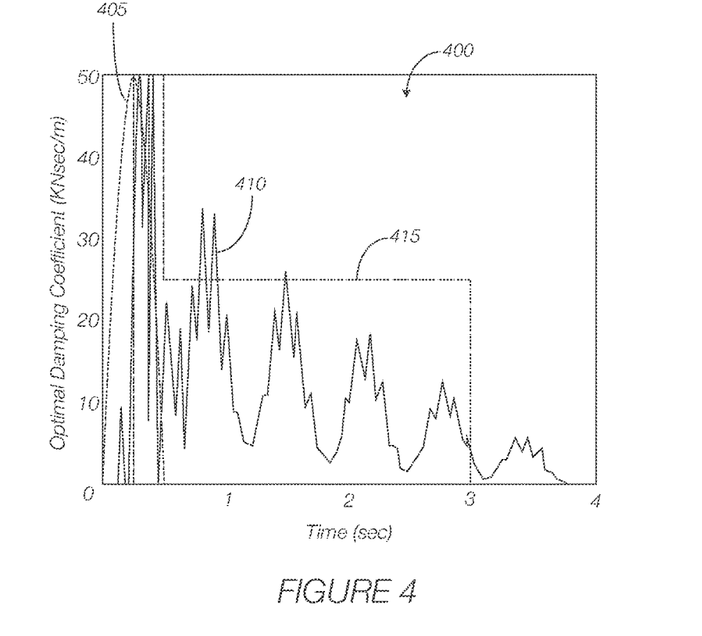
FIG. 4 is a graph illustrating an example change in damping coefficients applied to the suspension system when the vehicle encounters a road feature.

FIG. 4 is a graph 400 illustrating an example change in damping coefficients applied to the suspension system 105 when the vehicle 100 encounters a road feature. The x-axis represents time and the y-axis represents the damping coefficient. The road disturbance is shown at line 405. The calculated damping coefficient is shown at line 410, and a simplified damping coefficient is shown at line 415. Therefore, when the vehicle 100 encounters a road feature, a high damping coefficient may be applied initially (e.g., within 0.25 seconds of encountering the road feature). As the vehicle 100 heave begins to decrease, the damping coefficient may be reduced. As shown in the graph 400, the damping coefficient may be reduced approximately 50% after approximately 0.5 seconds from the initial encounter with the road feature. The reduced damping coefficient may continue to be applied for a predetermined amount of time, such as 3 seconds as shown in the graph 400.

Figure 5:
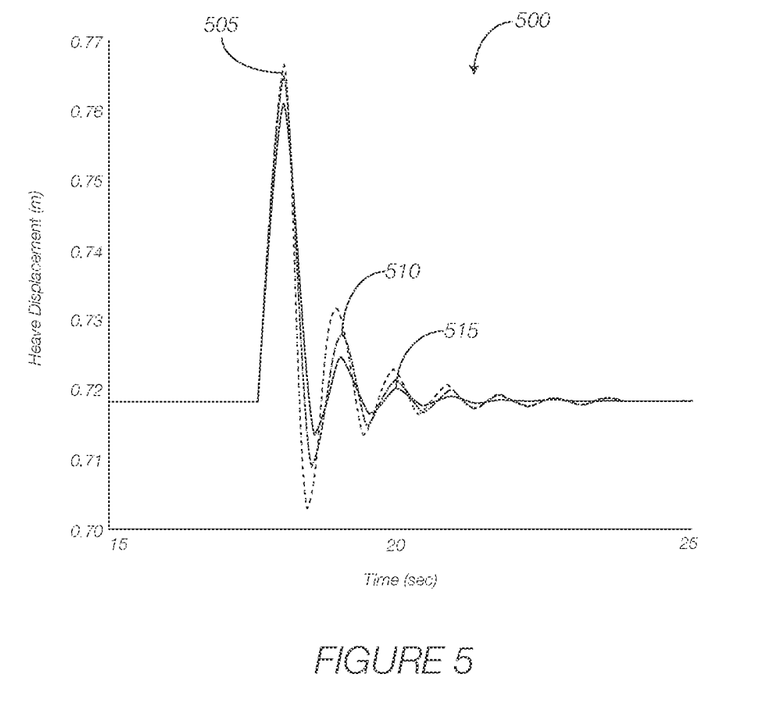
FIG. 5 is a graph illustrating heave displacements under various scenarios.

Anticipating the road roughness and applying the damping coefficient may reduce the heave displacement of the vehicle 100, as shown in FIG. 5. The graph 500 of FIG. 5 shows a first line 505 that represents the heave displacement experienced by the vehicle 100 with no preview (i.e., anticipation of the road feature) or feedback controller as shown in FIG. 3. A second line 510 illustrates the heave displacement with feedback but no preview. A third line 515 illustrates the heave displacement with both the preview and feedback in accordance with the control diagram 300 shown in FIG. 3. The third line 515 shows that with the preview and feedback, the maximum heave displacement is reduced, and the vehicle 100 returns to a steady-state position faster than the other scenarios illustrated.

Figure 6A:
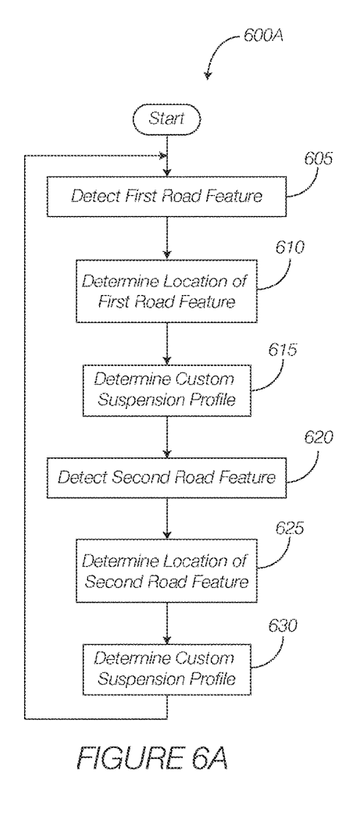
FIGS. 6A and 6B are flowcharts of exemplary processes that may be implemented by the vehicle system of FIG. 2.
Figure 6B:
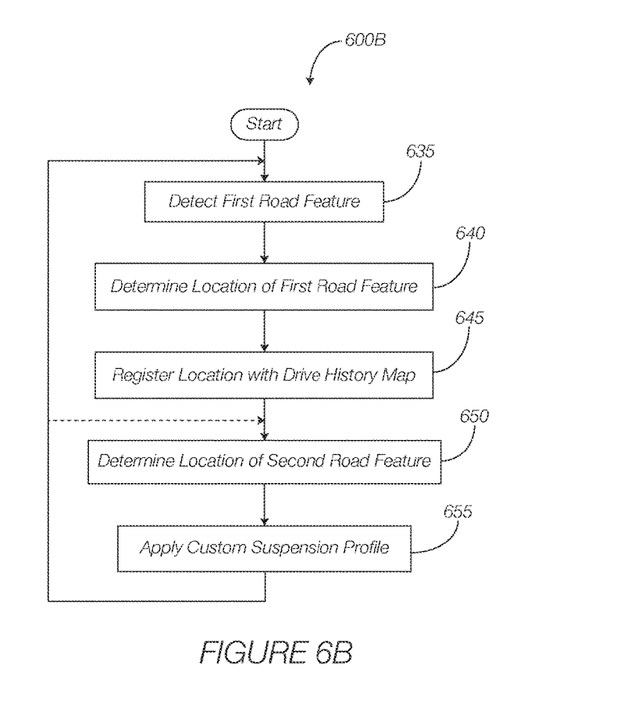

FIGS. 6A and 6B are flowcharts of exemplary processes 600A and 600B that may be implemented by the vehicle 100 system of FIG. 2. FIG. 6A is directed to a process 600A that may be executed the first time the vehicle 100 travels a particular road segment and FIG. 6B is directed to a process 600B that may be executed during subsequent trips along the same road segment.

Referring to FIG. 6A, at block 605, one or more sensors 130 may detect a first road feature. The first road feature may be detected from, e.g., a heave displacement experienced by the wheels 110 as the vehicle 100 traverses the first road feature.

At block 610, the processing device 135 may determine the location of the first road feature using, e.g., signals output by the navigation system 120. The location may be stored in the drive history map.

At block 615, the processing device 135 may select a custom suspension profile to apply to the suspension system 105 the next time the vehicle 100 encounters the first road feature. The custom suspension profile may be based on factors such as the length of the first road feature, the amount of heave displacement caused when traversing the first road feature, or the like. The custom suspension profile may be associated with the first road feature in the drive history map.

At block 620, the processing device 135 may detect a second road feature along the same or possibly different road. The second road feature may be detected from, e.g., a heave displacement experienced by the wheels 110 as the vehicle 100 traverses the second road feature.

At block 625, the processing device 135 may determine the location of the second road feature. As with the first road feature, the location of the second road feature may be based on, e.g., signals output by the navigation system 120. The location of the second road feature may be stored in the drive history map.

At block 630, the processing device 135 may determine a custom suspension profile to apply to the suspension system 105 the next time the vehicle 100 encounters the second road feature. Like the custom suspension profile associated with the first road feature, the suspension profile associated with the second road feature may be based on factors including the length of the second road feature, the amount of heave displacement caused when traversing the second road feature, or the like. The custom suspension profile may be associated with the first road feature in the drive history map. The process 600A may continue at block 605 to continually update the drive history map with additional road features.

Referring now to FIG. 6B, at block 635, the processing device 135 may detect a first road feature. The processing device 135 may detect the first road feature based on a signal output by one or more sensors 130. As discussed above, the sensor 130 may detect the first road feature based on, e.g., wheel speed, vertical acceleration, suspension height, or the like. The detection of the first road feature may register the road to the drive history map and may also be used to determine a more precise location of the vehicle 100.

At block 640, the processing device 135 may determine the location of the first road feature from, e.g., the signals output by one or more sensors 130, the drive history map, or both. While the processing device 135 may use the drive history map and the navigation system 120 to predict an estimated or likely location of the first road feature, the detection of the first road feature at block 635 may confirm the actual location of the first road feature. In some possible approaches, the processing device 135 may update the drive history map with the actual location or a more precise location based on the determination made at block 640.

At block 645, the processing device 135 may register the location of the first road feature using the drive history map. Registering the location of the first road feature may include confirming the location of the vehicle 100, selecting the appropriate drive history map based on the road the vehicle 100 is travelling on or the route taken by the vehicle 100, or the like.

At block 650, the processing device 135 may determine the location of a second road feature. The second road feature may be after the first road feature along a particular route, and the distance between the first road feature and the second road feature may be indicated in the drive history map. Thus, the processing device 135 may use the drive history map to determine the location of the second road feature.

At block 655, the processing device 135 may apply a particular suspension profile to the suspension system 105. The suspension profile may be associated with the road roughness at the location of the second road feature. The processing device 135 may select the particular suspension profile from the drive history map. Applying the suspension profile may include applying a particular damping coefficient based on the expected roughness at the location of the second road feature. The damping coefficient may be different from the damping coefficient that was being applied when the vehicle 100 encountered the first road feature at block 605. Moreover, as discussed above, the damping coefficient may be based on a classification associated with the second road feature. In some possible approaches, the processing device 135 may further apply a customized suspension profile at the location of the first road feature.

The process 600B may return to block 635 after block 655. Alternatively, if the vehicle 100 is to encounter a number of subsequent road features along a path, and the locations of those road features can be determined from the location of the first road feature, the process 600B may return to block 650 so that the locations of the subsequent road features can be identified and the appropriate damping coefficient can be applied.

In general, computing systems and/or devices discussed above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a sensor configured to detect a first road feature; and
a processor programmed to determine a location of a vehicle in response to detecting the first road feature and control an adjustable suspension system by applying a suspension profile to the adjustable suspension system prior to the vehicle arriving at a second road feature, wherein the suspension profile is associated with the second road feature and wherein a location of the second road feature is determined from the location of the vehicle at a time the first road feature is detected, wherein the first road feature and the second road feature represent road roughness measured during previous trips along a route.

2. The vehicle system of claim 1, wherein applying the suspension profile includes applying a first damping coefficient to the suspension system at a location of the first road feature and a second damping coefficient at the location of the second road feature.

3. The vehicle system of claim 2, wherein the first damping coefficient is based on a characteristic of the first road feature and wherein the second damping coefficient is based on a predicted characteristic of the second road feature.

4. The vehicle system of claim 3, wherein the characteristic includes road roughness.

5. The vehicle system of claim 2, wherein applying the suspension profile includes applying a third damping coefficient to the suspension system at a predicted location of a third road feature, wherein the location of the third road feature is predicted according to the location of the first road feature.

6. The vehicle system of claim 1, wherein the processor is programmed to determine locations of the first road feature and the second road feature from a drive history map.

7. The vehicle system of claim 6, wherein the processor is programmed to determine a distance between the first road feature and the second road feature based on the drive history map.

8. A vehicle system comprising:
a processor programmed to determine a location of a vehicle based on a first road feature detected by a sensor and control a vehicle suspension system by applying a suspension profile to the vehicle suspension system, wherein the suspension profile is associated with the second road feature and wherein a location of the second road feature is determined from the location of the vehicle at a time the first road feature is detected, wherein the first road feature and the second road feature represent road roughness measured during previous trips along a route.

9. The vehicle system of claim 8, wherein applying the suspension profile includes applying a first damping coefficient to the suspension system at a location of the first road feature and a second damping coefficient at the location of the second road feature.

10. The vehicle system of claim 9, wherein the first damping coefficient is based on a characteristic of the first road feature and wherein the second damping coefficient is based on a predicted characteristic of the second road feature.

11. The vehicle system of claim 10, wherein the characteristic includes road roughness.

12. The vehicle system of claim 9, wherein applying the suspension profile includes applying a third damping coefficient to the suspension system at a predicted location of a third road feature, wherein the location of the third road feature is predicted according to the location of the first road feature.

13. The vehicle system of claim 8, wherein the processor is programmed to determine locations of the first road feature and the second road feature from a drive history map.

14. The vehicle system of claim 8, wherein the processor is programmed to determine a distance between the first road feature and the second road feature.

15. A method comprising: generating a drive history map that identifies a plurality of road features, including a first road feature and a second road feature, along a route and wherein the second road feature is after the first road feature along the route, wherein the first road feature and the second road feature represent road roughness measured during previous trips along the route; determining a location of a vehicle in response to detecting the first road feature; determining a location of the second road feature from the drive history map in response to detecting the first road feature, wherein the location of the second road feature is determined from the location of the vehicle at a time the first road feature is detected; and controlling a vehicle suspension system by applying a suspension profile to the vehicle suspension system, wherein the suspension profile is associated with the second road feature.

16. The method of claim 15, wherein applying the suspension profile includes applying a first damping coefficient to the suspension system at a location of the first road feature and a second damping coefficient at the location of the second road feature.

17. The method of claim 15, wherein the location of the second road feature is determined from a distance between the first road feature and the second road feature.

* * * * *

UNITED STATES PATENT AND TRADEMARK OFFICE
CERTIFICATE OF CORRECTION

PATENT NO. : 10,160,281 B2
APPLICATION NO. : 14/268401
DATED : December 25, 2018
INVENTOR(S) : Douglas Scott Rhode et al.

It is certified that error appears in the above-identified patent and that said Letters Patent is hereby corrected as shown below:

In the Claims

Column 10, Line 34    After "route" insert the following paragraph:
--detecting, via a vehicle sensor, the first road feature;--

Signed and Sealed this
Nineteenth Day of March, 2019

Andrei Iancu
*Director of the United States Patent and Trademark Office*